United States Patent
Onishi

(10) Patent No.: US 9,069,194 B2
(45) Date of Patent: Jun. 30, 2015

(54) POLARIZATION CONTROL DEVICE

(71) Applicant: Sumitomo Electric Industries, LTD., Osaka-shi, Osaka (JP)

(72) Inventor: Yutaka Onishi, Yamato (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/073,349

(22) Filed: Nov. 6, 2013

(65) Prior Publication Data
US 2014/0126855 A1    May 8, 2014

(30) Foreign Application Priority Data
Nov. 6, 2012  (JP) ................................. 2012-244835

(51) Int. Cl.
*G02B 6/10* (2006.01)
*G02F 1/035* (2006.01)
*G02F 1/01* (2006.01)
*G02B 6/27* (2006.01)
*G02B 6/125* (2006.01)
*G02F 1/21* (2006.01)

(52) U.S. Cl.
CPC .............. *G02F 1/0136* (2013.01); *G02B 6/105* (2013.01); *G02B 6/2793* (2013.01); *G02B 6/125* (2013.01); *G02F 2001/217* (2013.01)

(58) Field of Classification Search
CPC ...... G02B 6/125; G02B 6/105; G02B 6/2793; G02B 2006/12159; G02B 2006/12097; G02B 2006/12195
USPC ....................................................... 385/3, 132
See application file for complete search history.

(56) References Cited

U.S. PATENT DOCUMENTS

| | | | |
|---|---|---|---|
| 6,614,947 B1 * | 9/2003 | Al-hemyari | 385/3 |
| 6,668,103 B2 * | 12/2003 | Hosoi | 385/2 |
| 2001/0009594 A1 * | 7/2001 | Hosoi | 385/2 |
| 2005/0069240 A1 * | 3/2005 | Griffin et al. | 385/3 |
| 2005/0094923 A1 * | 5/2005 | Kim et al. | 385/14 |

FOREIGN PATENT DOCUMENTS

JP      4410149      12/2006

* cited by examiner

*Primary Examiner* — Eric Wong
*Assistant Examiner* — Mary El Shammaa
(74) *Attorney, Agent, or Firm* — Smith, Gambrell & Russell LLP.

(57) ABSTRACT

A polarization control device includes a MMI device having primary-side and secondary-side end-faces; a first phase shifter optically coupled to a first port in the primary-side end-face; a first optical waveguide optically coupled via the first phase shifter to the first port in the primary-side end-face; a second optical waveguide optically coupled to a second port in the primary-side end-face; and a tapered waveguide optically coupled to a first port in the secondary-side end-face. The first and second ports in the primary-side end-face are located on first and second axes, respectively. The first port in the secondary-side end-face is located on a third axis located between the first and second axes. The first, second, and third axes extend in a direction from the primary-side end-face to the secondary-side end-face. The tapered waveguide has a width decreasing in a direction from one end to the other end of the tapered waveguide.

11 Claims, 11 Drawing Sheets

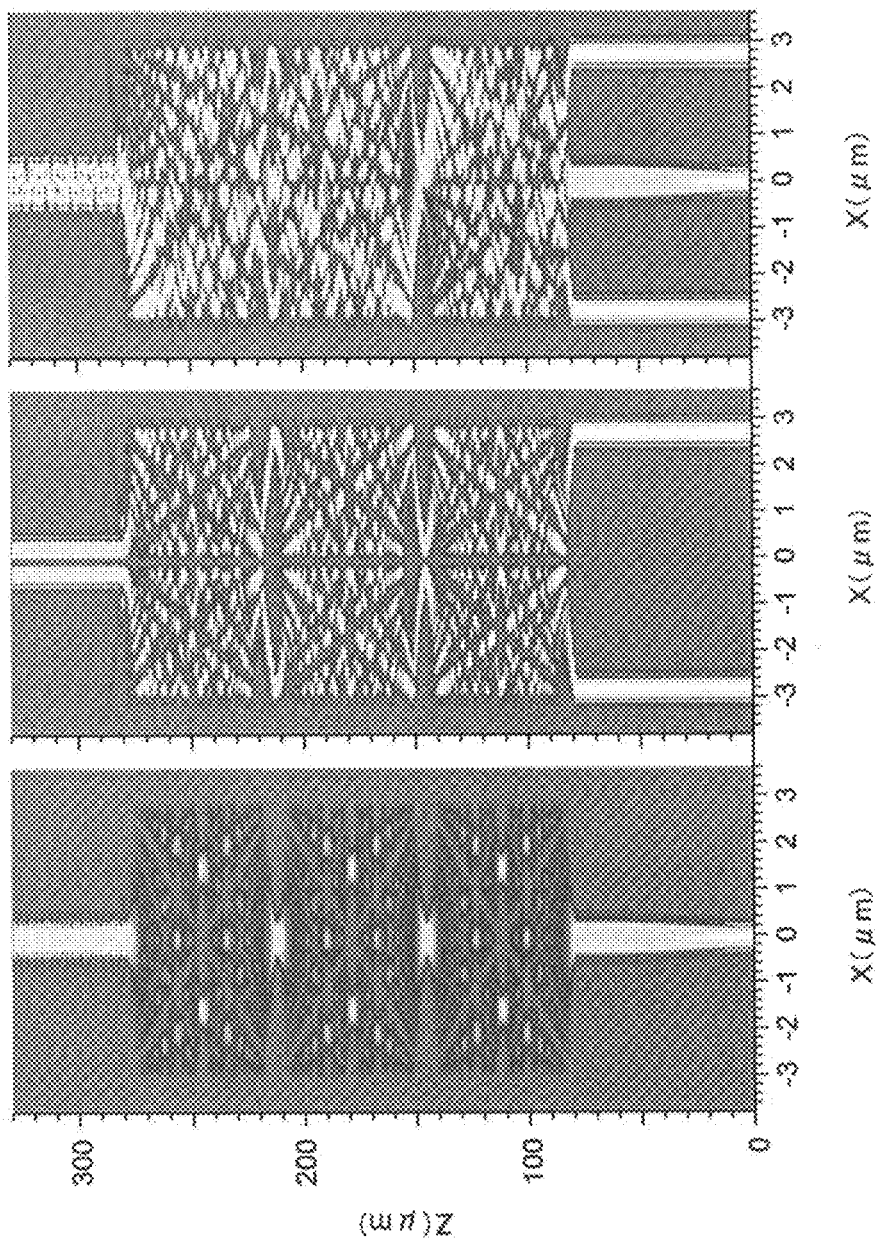

POLARIZATION CONTROL DEVICE

BACKGROUND OF THE INVENTION

1. Field of the Invention

The present invention relates to a polarization control device.

2. Description of the Related Art

Japanese Patent No. 4410149 discloses a polarization rotation device. The polarization rotation device includes a first core layer having a rectangular cross section, a second core layer having a rectangular cross section, and a cladding layer. The first core layer is covered with the second core layer, which is covered with the cladding layer. A refractive index of the first core layer is greater than those of the second core layer and the cladding layer, and the refractive index of the second core layer is greater than that of the cladding layer. A central axis of the first core layer in the light propagation direction differs from that of the second core layer in the light propagation direction. The length of the second core layer in the light propagation direction is set such that polarization of linearly polarized light is rotated 90 degrees while propagating through the first and second core layers.

SUMMARY OF THE INVENTION

The polarization rotation device disclosed in Japanese Patent No. 4410149 includes the first core layer, the second core layer, and the cladding layer as described above. The polarization rotation device has an eccentric double core structure where the central axis of the first core layer in the light propagation direction does not coincide with the central axis of the second core layer in the light propagation direction. By allowing linearly polarized light to propagate by a certain distance in an optical waveguide having the eccentric double core structure, the polarization state of light can be changed. For example, a polarization-independent waveguide can be realized by using this polarization rotation device. Specifically, by providing a polarization separation element in the upstream position of the polarization rotation device, light containing both a transverse electric (TE) polarization component and a transverse magnetic (TM) polarization component is separated depending on the plane of polarization. By allowing one of the separated polarization components (e.g., TM polarization component) to pass through the polarization rotation device, the plane of polarization is rotated by an angle of 90 degrees to convert the one polarization component to the other polarization component. By combining the polarization component that has passed through the polarization rotation device with the polarization component that does not pass through the polarization rotation device, a polarization-independent waveguide can be realized.

More specifically, the polarization rotation device disclosed in Japanese Patent No. 4410149 has a structure that includes the first core layer made of silicon (Si) and the second core layer made of silicon oxide nitride (SiON). In addition, the second core layer is formed to cover the first core layer. In this structure, a side face of the first core layer is made coincide with that of the second core layer. The method for manufacturing this structure includes a step of etching the first core layer made of Si, which is followed by depositing a SiON film. Then, the SiON film is etched such that a side face of the SiON film coincides with that of the first core layer. This process requires high-precision alignment which makes the etched side face of the SiON film exactly coincide with the side face of the first core layer. However, it is difficult in practice to avoid a deviation in alignment, and hence difficult to make the etched side face of the SiON film exactly coincide with the side face of the first core layer. Such a mismatch between the etched side face of the SiON film and the side face of the first core layer results from alignment and thus is inevitable. Therefore, it is difficult to manufacture polarization rotation devices having the above-described structure with stability and good reproducibility. This results in variation in characteristics of polarization rotation devices.

A polarization control device according to an aspect of the present invention includes (a) a multi-mode interference device having a primary-side end face including a first port and a second port, a secondary-side end face including a first port, a first side face, and a second side face; (b) a first phase shifter optically coupled to the first port in the primary-side end face of the multi-mode interference device; (c) a first optical waveguide optically coupled via the first phase shifter to the first port in the primary-side end face of the multi-mode interference device; (d) a second optical waveguide optically coupled to the second port in the primary-side end face of the multi-mode interference device; and (e) a tapered waveguide having one end and the other end, the one end being optically coupled to the first port in the secondary-side end face of the multi-mode interference device. The first port in the primary-side end face and the second port in the primary-side end face are located on a first axis and a second axis, respectively, in the primary-side end face. The first port in the secondary-side end face is located on a third axis in the secondary-side end face, the third axis being located between the first axis and the second axis. The first axis, the second axis, and the third axis extend in a direction from the primary-side end face to the secondary-side end face of the multi-mode interference device. In addition, the tapered waveguide has a width decreasing in a direction from the one end to the other end of the tapered waveguide.

In the polarization control device described above, the first optical waveguide is optically coupled via the first phase shifter to the first port in the primary-side end face of the multi-mode interference device. The second optical waveguide is optically coupled to the second port in the primary-side end face of the multi-mode interference device. Therefore, by using the first phase shifter, a phase difference between a light beam propagating in the first optical waveguide and a light beam propagating in the second optical waveguide is adjusted. These two propagating light beams having a phase difference enter the respective first and second ports in the primary-side end face of the multi-mode interference device. Because of the phase difference, when TE polarized light enters the primary-side end face of the multi-mode interference device, TE polarized light of higher-order mode (first-order mode) is generated at the first port in the secondary-side end face of the multi-mode interference device. The higher-order mode light enters and propagates through the tapered waveguide. The tapered waveguide has a structure where the waveguide width decreases along the optical waveguiding direction. Therefore, the TE polarized light of first-order mode in the tapered waveguide is converted to TM polarized light of fundamental mode.

On the other hand, when TM polarized light of fundamental mode enters the other end of the tapered waveguide, the tapered waveguide converts the TM polarized light to TE polarized light of higher-order mode. The TE polarized light of higher-order mode enters the first port in the secondary-side end face of the multi-mode interference device. The multi-mode interference device generates TE polarized light of fundamental mode at the first and second ports in the primary-side end face thereof. The phase of the TE polarized light at the first port differs from that of the TE polarized light at the second port. These beams of the TE polarized light propagate through the respective first and second optical waveguides. The phases of these beams propagating in the first and second optical waveguides are adjusted by using the first phase shifter.

In the polarization control device according to the aspect of the present invention, the first side face and the second side face preferably extend in the direction from the primary-side end face to the secondary-side end face of the multi-mode interference device. The first optical waveguide preferably has an outer side face extending continuously to the first side face of the multi-mode interference device. In addition, the second optical waveguide preferably has an outer side face extending continuously to the second side face of the multi-mode interference device.

In the polarization control device described above, an optical loss in the multi-mode interference device can be reduced.

The polarization control device according to the aspect of the present invention may further include a second phase shifter optically coupled to the second port in the primary-side end face of the multi-mode interference device. The second optical waveguide may be optically coupled via the second phase shifter to the second port in the primary-side end face of the multi-mode interference device.

The polarization control device according to the aspect of the present invention may further include a branching waveguide having a primary-side end including a port and a secondary-side end including a first port and a second port. The first optical waveguide and the second optical waveguide are optically coupled to the first port and the second port, respectively, in the secondary-side end of the branching waveguide.

In the polarization control device described above, the branching waveguide supplies light beams of equal phase to the first optical waveguide and the second optical waveguide. By using the first phase shifter, a phase difference between light beams propagating in the first and second optical waveguides is adjusted, so that light beams having the same polarization and different phases are supplied to the multi-mode interference device. By adjusting the phase difference, light beams having a desired phase difference are supplied to the first and second ports in the primary-side end face of the multi-mode interference device.

The polarization control device according to the aspect of the present invention may further include an input waveguide configured to supply input light containing TE polarized light to the port in the primary-side end of the branching waveguide.

The polarization control device according to the aspect of the present invention may further include a third optical waveguide. The multi-mode interference device may have a third port in the primary-side end face, the third port being located between the first port and the second port in the primary-side end face of the multi-mode interference device. The third optical waveguide may be optically coupled to the third port in the primary-side end face of the multi-mode interference device. In addition, the third port in the primary-side end face may be located on the third axis in the primary-side end face.

In the polarization control device described above, the third optical waveguide is optically coupled to the third port in the primary-side end face of the multi-mode interference device. The third port in the primary-side end face is located on the third axis in the primary-side end face. Therefore, light from the third optical waveguide is coupled to the first port on the third axis in the secondary-side end face. When TE polarized light enters the primary-side end face of the multi-mode interference device, TE polarized light of fundamental mode is generated at the first port in the secondary-side end face of the multi-mode interference device.

The polarization control device is formed by a passive device. Therefore, when TM polarized light of fundamental mode propagates backward through the polarization control device, the tapered waveguide generates TE polarized light of higher-order mode from the TM polarized light of fundamental mode. The TE polarized light enters the first port in the secondary-side end face of the multi-mode interference device, which supplies the TE polarized light to the third port in the primary-side end face.

The polarization control device according to the aspect of the present invention may further include a second multi-mode interference device having a primary-side end face including a port, a secondary-side end face, a first side face, and a second side face, the secondary-side end face including a first port, a second port, and a third port. The first optical waveguide, the second optical waveguide, and the third optical waveguide are optically coupled to the first port, the second port, and the third port, respectively, in the secondary-side end face of the second multi-mode interference device.

The polarization control device according to the aspect of the present invention may further include a branching waveguide having a primary-side end including a port and a secondary-side end including a first port, a second port, and a third port. The first optical waveguide, the second optical waveguide, and the third optical waveguide are optically coupled to the first port, the second port, and the third port, respectively, in the secondary-side end of the branching waveguide.

The polarization control device according to the aspect of the present invention may further include a third phase shifter optically coupled to the third port in the primary-side end face of the multi-mode interference device. The third optical waveguide is optically coupled via the third phase shifter to the third port in the primary-side end face of the multi-mode interference device.

In the polarization control device according to the aspect of the present invention, the multi-mode interference device may have a 2×1 multi-mode interference device (MMI) structure.

The polarization control device according to the aspect of the present invention may further include a fourth optical waveguide configured to supply input light containing TE polarized light and/or TM polarized light to the multi-mode interference device. The fourth optical waveguide is optically coupled via the tapered waveguide to the first port in the secondary-side end face of the multi-mode interference device.

In the polarization control device described above, TE polarized light of fundamental mode is generated as TM polarized light of fundamental mode. Also, TM polarized light of fundamental mode is converted to TE polarized light of fundamental mode.

BRIEF DESCRIPTION OF THE DRAWINGS

FIGS. 7A to 7C illustrate MMI interference patterns calculated using a finite difference time domain (FDTD) method.

DESCRIPTION OF THE PREFERRED EMBODIMENTS

Figure 1:
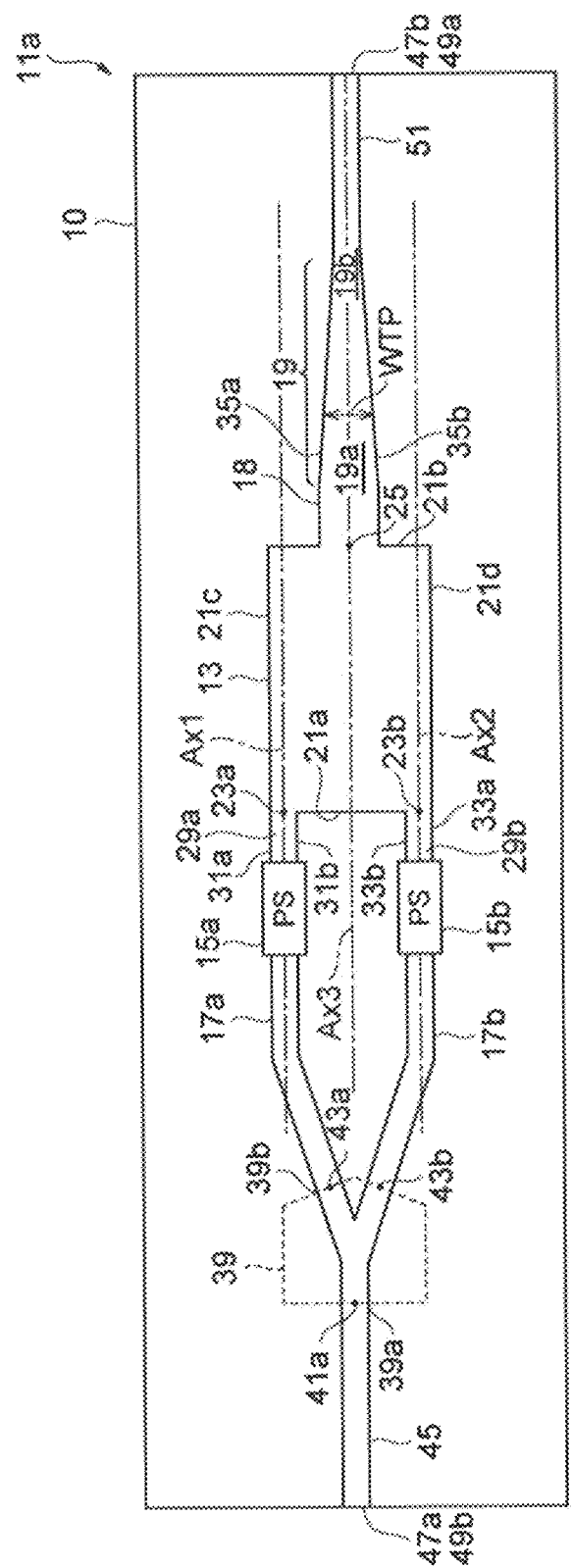
FIG. 1 illustrates a structure of a polarization control device according to a first embodiment.

The findings of the present invention can be readily understood by considering the following detailed description in conjunction with the attached drawings shown as exemplifications. Embodiments of a polarization control device according to the present invention will now be described with reference to the attached drawings. Where possible, the same components are assigned the same reference numerals.

Figure 2:
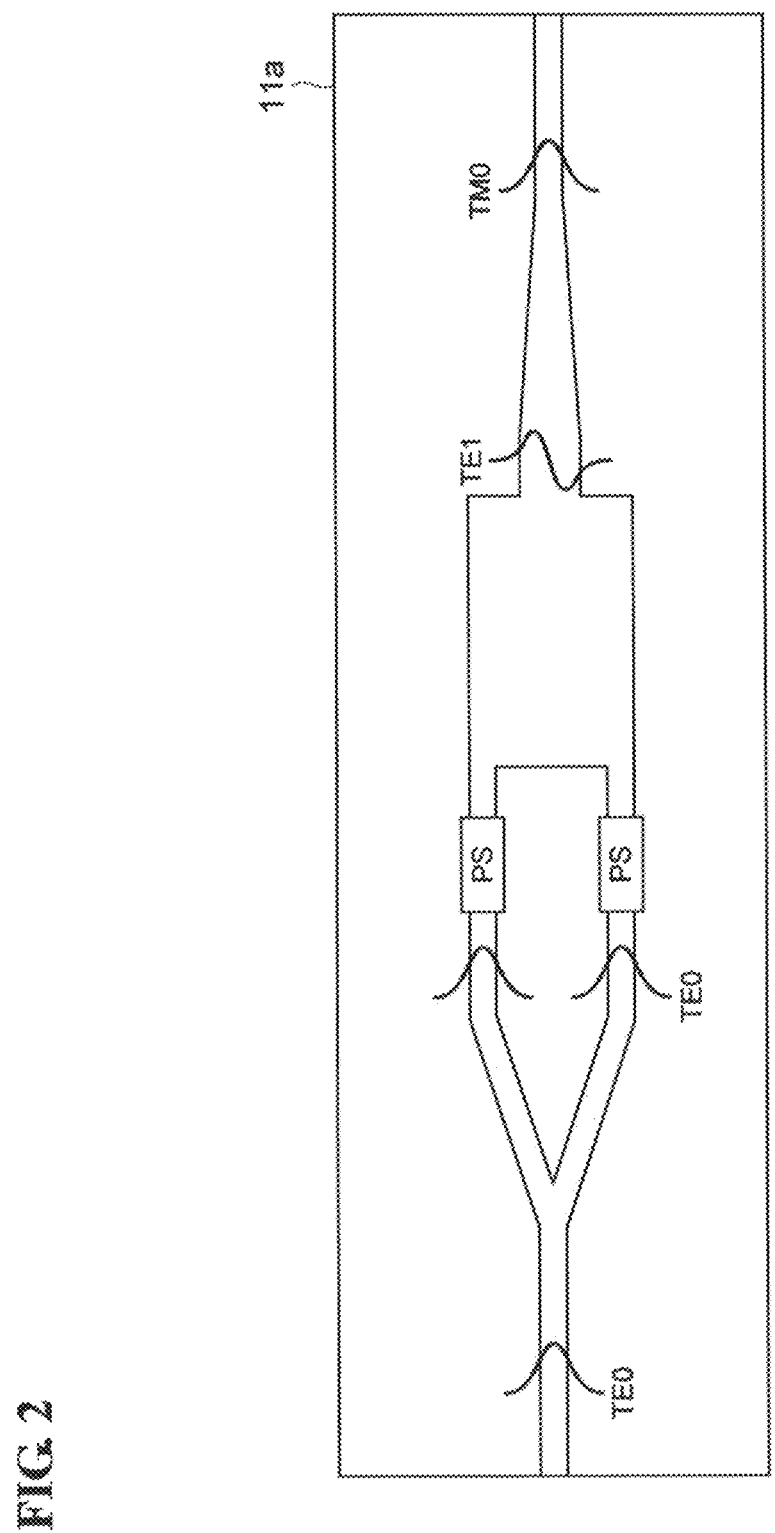
FIG. 2 illustrates propagation of light in the polarization control device illustrated in FIG. 1.

FIG. 1 illustrates a structure of a polarization control device according to a first embodiment. FIG. 2 illustrates a polarization mode (TE mode or TM mode) propagating in the polarization control device illustrated in FIG. 1. A polarization control device 11a includes a multi-mode interference (MMI) device 13, a first phase shifter 15a, a second phase shifter 15b, a first optical waveguide 17a, a second optical waveguide 17b, and a tapered waveguide 19. The multi-mode interference device 13 has a primary-side end face 21a, a secondary-side end face 21b, a first side face 21c, and a second side face 21d. The multi-mode interference device 13 has a multi-mode waveguide structure. The multi-mode interference device 13, the first optical waveguide 17a, the second optical waveguide 17b, and the tapered waveguide 19 are disposed on a substrate 10. The multi-mode interference device 13, the first optical waveguide 17a, the second optical waveguide 17b, and the tapered waveguide 19 include a first cladding layer, a core layer, and a second cladding layer, which are disposed in this order on the substrate 10. The primary-side end face 21a has a first port 23a and a second port 23b. The secondary-side end face 21b has a first port 25. In the multi-mode interference device 13, a first axis Ax1, a second axis Ax2, and a third axis Ax3 extend in a direction from the primary-side end face 21a to the secondary-side end face 21b. The third axis Ax3 is located between the first axis Ax1 and the second axis Ax2. The first port 23a and the second port 23b in the primary-side end face 21a are located on the first axis Ax1 and the second axis Ax2, respectively, in the primary-side end face 21a. The first port 25 in the secondary-side end face 21b is located on the third axis Ax3 in the secondary-side end face 21b. In the multi-mode interference device 13, the first axis Ax1, the third axis Ax3, and the second axis Ax2 are preferably arranged, at regular intervals, in this order in the direction from the first side face 21c to the second side face 21d.

The first phase shifter 15a is optically coupled to the first port 23a in the primary-side end face 21a of the multi-mode interference device 13. The second phase shifter 15b is optically coupled to the second port 23b in the primary-side end face 21a of the multi-mode interference device 13. The first phase shifter 15a and the second phase shifter 15b are optically connected via respective single-mode waveguides to the first and second ports 23a and 23b, respectively, in the primary-side end face 21a of the multi-mode interference device 13. The first optical waveguide 17a is optically coupled via the first phase shifter 15a to the first port 23a in the primary-side end face 21a of the multi-mode interference device 13. The second optical waveguide 17b is optically coupled via the second phase shifter 15b to the second port 23b in the primary-side end face 21a of the multi-mode interference device 13. The first optical waveguide 17a and the second optical waveguide 17b are a single-mode waveguide.

The first phase shifter 15a and the second phase shifter 15b have a waveguide structure including a first cladding layer, a core layer, and a second cladding layer. The first phase shifter 15a and the second phase shifter 15b may include an electrode or a heater for varying a refractive index of the waveguide structure. Although two phase shifters are used in the structure of the polarization control device 11a, only one phase shifter may be provided on one of the optical waveguides. The same applies to the structure of a phase shifter of polarization control devices 11b and 11c to be described below.

The tapered waveguide 19 has one end 19a and the other end 19b. The one end 19a of the tapered waveguide 19 is optically coupled to the first port 25 in the secondary-side end face 21b of the multi-mode interference device 13. A width WTP of the tapered waveguide 19 decreases in the direction from the one end 19a to the other end 19b of the tapered waveguide 19. The one end 19a of the tapered waveguide 19 is optically coupled via a multi-mode waveguide 18 to the first port 25 in the secondary-side end face 21b of the multi-mode interference device 13.

The polarization mode (TE mode or TM mode) of light propagating in the polarization control device 11a will be described with reference to FIG. 2. The first optical waveguide 17a is optically coupled via the first phase shifter 15a to the first port 23a in the primary-side end face 21a of the multi-mode interference device 13. The second optical waveguide 17b is optically coupled via the second phase shifter 15b to the second port 23b in the primary-side end face 21a of the multi-mode interference device 13. Therefore, by using both or either one of the first phase shifter 15a and the second phase shifter 15b, a phase difference can be created between light beams propagating in the first and second optical waveguides 17a and 17b. These two propagating light beams having a phase difference enter the respective first and second ports 23a and 23b in the primary-side end face 21a of the multi-mode interference device 13. Because of the phase difference, when TE polarized light enters the primary-side end face 21a of the multi-mode interference device 13, TE1 polarized light of higher-order mode is generated at the first port 25 in the secondary-side end face 21b of the multi-mode interference device 13. The higher-order mode light enters and propagates through the tapered waveguide 19. When TE polarized light of higher-order mode enters the one end 19a of the tapered waveguide 19, the higher-order mode light in the tapered waveguide 19 is converted to TM polarized light of fundamental mode because of the reduction in the width WTP of the tapered waveguide 19.

On the other hand, when TM polarized light enters the other end 19b of the tapered waveguide 19, the tapered waveguide 19 converts the TM polarized light of fundamental mode to TE polarized light of higher-order mode. The TE polarized light of higher-order mode passes through the multi-mode waveguide 18 and enters the first port 25 in the secondary-side end face 21b of the multi-mode interference device 13. The multi-mode interference device 13 generates TE polarized light of fundamental mode at the first and second ports 23a and 23b in the primary-side end face 21a. The phase of the TE polarized light at the first port 23a differs from that of the TE polarized light at the second port 23b. After phase adjustment, beams of the TE polarized light propagate through the first and second optical waveguides 17a and 17b. By using the first and second phase shifters 15a and 15b, the phases of the light beams propagating through the first and second optical waveguides 17a and 17b can be adjusted.

The polarization control device 11a will be described with reference again to FIG. 1. The primary-side end face 21a, the secondary-side end face 21b, the first side face 21c, and the second side face 21d define a multi-mode waveguide. The multi-mode waveguide of the multi-mode interference device 13 includes a first cladding layer, a core layer, and a second cladding layer. The core layer is sandwiched between the first and second cladding layers. The first cladding layer, the core layer, and the second cladding layer are disposed in this order on the substrate 10. A first optical waveguide 29a is connected to the first port 23a in the primary-side end face 21a on the first axis Ax1 of the three axes extending from the primary-side end face 21a to the secondary-side end face 21b. The first optical waveguide 29a extends along the first axis Ax1. A second optical waveguide 29b is connected to the second port 23b in the primary-side end face 21a on the second axis Ax2 of the three axes extending from the primary-side end face 21a to the secondary-side end face 21b. The second optical waveguide 29b extends along the second axis Ax2. The tapered waveguide 19 is connected to the first port 25 in the secondary-side end face 21b on the third axis Ax3 of the three axes extending from the primary-side end face 21a to the secondary-side end face 21b. The first side face 21c and the second side face 21d of the multi-mode interference device 13 extend in the direction of the first axis Ax1, the second axis Ax2, and the third axis Ax3. In the primary-side end face 21a of the multi-mode interference device 13, a first point (the position of the first port 23a), a third point, and a second point (the position of the second port 23b) are arranged in this order in the direction from the first side face 21c to the second side face 21d of the multi-mode interference device 13. These three points (the first point, the second point, and the third point) are defined as points of intersection of a first reference plane extending along the primary-side end face 21a and the first axis Ax1, the second axis Ax2, and the third axis Ax3. In the secondary-side end face 21b of the multi-mode interference device 13, a first point, a third point (the position of the first port 25), and a second point are arranged in this order in the direction from the first side face 21c to the second side face 21d of the multi-mode interference device 13.

The first and second side faces 21c and 21d extend in the direction from the primary-side end face 21a to the secondary-side end face 21b of the multi-mode interference device 13. In an example, an outer side face 31a of the first optical waveguide 29a extends continuously to the first side face 21c of the multi-mode interference device 13. An outer side face 33a of the second optical waveguide 29b extends continuously to the second side face 21d of the multi-mode interference device 13. In the polarization control device 11a having the configuration described above, an optical loss in the multi-mode waveguide 18 can be reduced. An inner side face 31b of the first optical waveguide 29a is connected to the primary-side end face 21a. An inner side face 33b of the second optical waveguide 29b is also connected to the primary-side end face 21a. A pair of side faces 35a and 35b of the tapered waveguide 19 is connected to the secondary-side end face 21b.

As illustrated in FIG. 1, the polarization control device 11a further includes a branching (combining) waveguide 39, which has a primary-side end 39a and a secondary-side end 39b. The primary-side end 39a has a port 41a, and the secondary-side end 39b has a first port 43a and a second port 43b. Thus, the branching waveguide 39 has a one-port and two-port structure (1×2 optical coupler structure). The first and second optical waveguides 17a and 17b are optically coupled to the first and second ports 43a and 43b, respectively, in the secondary-side end 39b of the branching waveguide 39. In the polarization control device 11a, the branching waveguide 39 supplies light beams having the same phase to the first and second optical waveguides 17a and 17b. By using the first and second phase shifters 15a and 15b, a phase difference is created between light beams propagating in the first and second optical waveguides 17a and 17b. Thus, light beams having the same polarization and different phases are supplied to the multi-mode interference device 13. By adjusting the phase difference, light beams having a desired phase difference are supplied to the first and second ports 23a and 23b in the primary-side end face 21a of the multi-mode interference device 13. In addition, the branching waveguide 39 combines the light beams from the first and second optical waveguides 17a and 17b.

As illustrated in FIGS. 1 and 2, the multi-mode interference device 13 has a 2×1 MMI structure.

The polarization control device 11a has an input port 47a and an output port 47b. The polarization control device 11a further includes an input waveguide 45. The input waveguide 45 supplies input light containing TE polarized light to the port 41a. In an example, the input waveguide 45 extends from the port 41a of the branching waveguide 39 to the input port 47a of the polarization control device 11a. In the polarization control device 11a, the input light passes through the tapered waveguide 19 and a single-mode waveguide connected to the tapered waveguide 19, and then reaches the output port 47b. In the polarization control device 11a, TM polarized light of fundamental mode is generated at the output port 47b.

Alternatively, the polarization control device 11a has an input port 49a and an output port 49b. The polarization control device 11a further includes an input optical waveguide 51. The input optical waveguide 51 is a fourth optical waveguide in the first embodiment. The input optical waveguide 51 supplies input light containing TE polarized light and/or TM polarized light to the multi-mode interference device 13. The input optical waveguide 51 is optically coupled via the tapered waveguide 19 to the first port 25. The input optical waveguide 51 is a single-mode waveguide. In an example, the polarization control device 11a generates TE polarized light of fundamental mode at the first and second ports 23a and 23b in the primary-side end face 21a of the multi-mode interference device 13. The generated beams of light pass through the respective first and second phase shifters 15a and 15b and are input to the branching waveguide 39, which generates combined light. Only one of the first and second phase shifters 15a and 15b may be used here. The combined light passes through the single-mode waveguide (input waveguide) 45 and reaches the output port 49b of the polarization control device 11a.

In the polarization control device 11a described above, TE polarized light of fundamental mode is converted to TM polarized light of fundamental mode. Also, TM polarized light of fundamental mode is converted to TE polarized light of fundamental mode.

Figure 3:
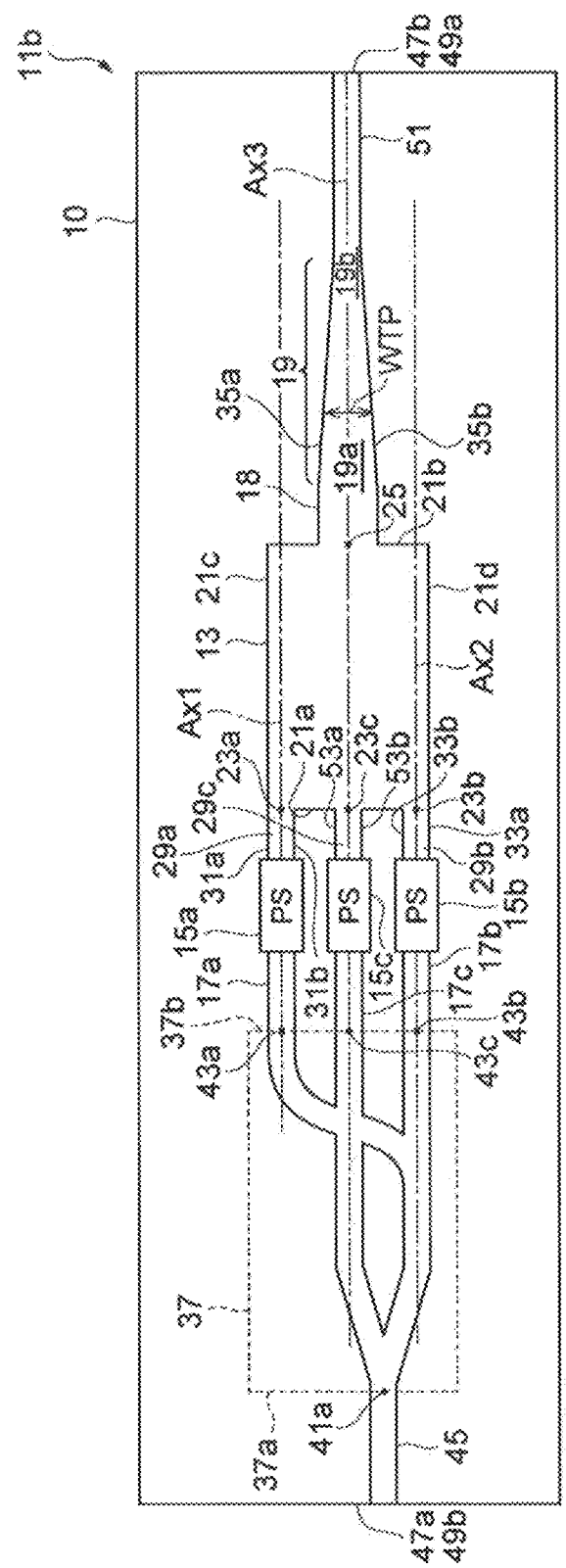
FIG. 3 illustrates a structure of a polarization control device according to a second embodiment.
Figure 4:
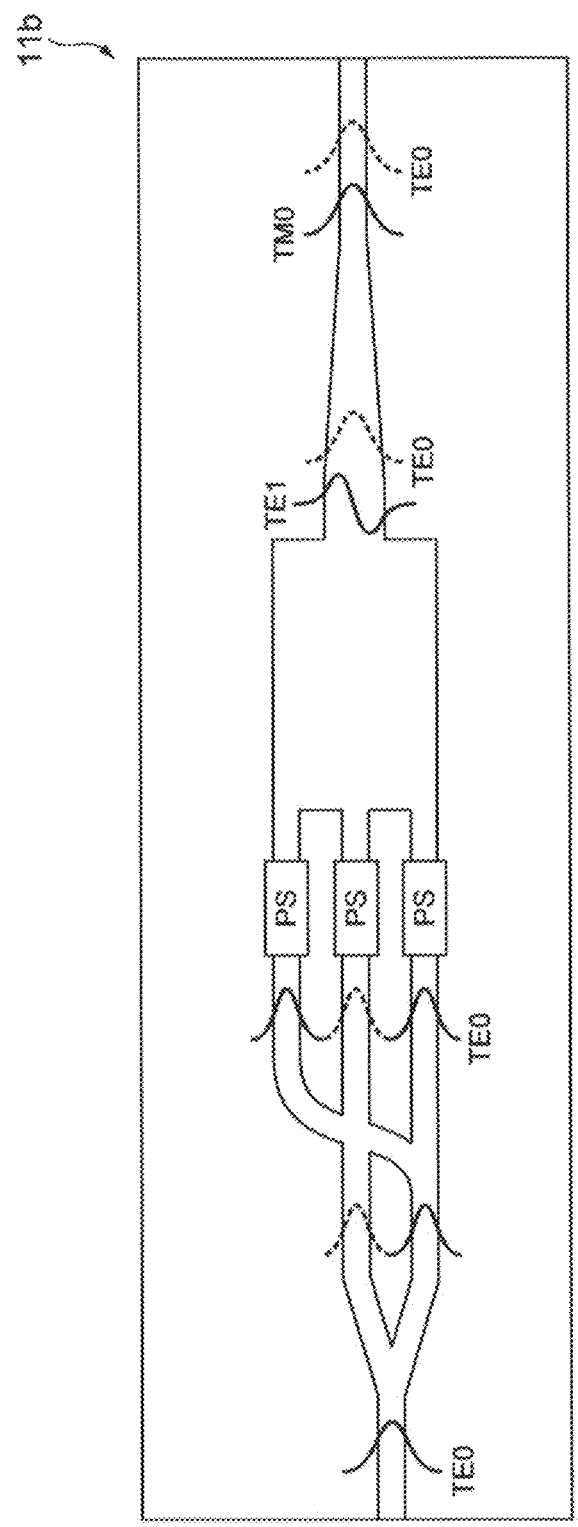
FIG. 4 illustrates propagation of light in the polarization control device illustrated in FIG. 3.

FIG. 3 illustrates a structure of a polarization control device according to a second embodiment. FIG. 4 illustrates a polarization mode (TE mode or TM mode) of light propagating in the polarization control device illustrated in FIG. 3. A polarization control device 11b includes the multi-mode interference device 13, the first phase shifter 15a, the second phase shifter 15b, a third phase shifter 15c, the first optical waveguide 17a, the second optical waveguide 17b, a third optical waveguide 17c, and the tapered waveguide 19. The multi-mode interference device 13 has the primary-side end face 21a, the secondary-side end face 21b, the first side face 21c, and the second side face 21d. The multi-mode interference device 13 has a multi-mode waveguide structure. The multi-mode interference device 13, the first to third optical waveguides 17a to 17c, and the tapered waveguide 19 are disposed on the substrate 10. The multi-mode interference device 13, the first optical waveguide 17a, the second optical waveguide 17b, the third optical waveguide 17c, and the tapered waveguide 19 include a first cladding layer, a core layer, and a second cladding layer, which are disposed in this order on the substrate 10. The primary-side end face 21a has the first port 23a, the second port 23b, and a third port 23c. The third port 23c is located between the first port 23a and the second port 23b. The secondary-side end face 21b has the first port 25. In the multi-mode interference device 13, the first axis Ax1, the second axis Ax2, and the third axis Ax3 extend in the direction from the primary-side end face 21a to the secondary-side end face 21b. The first port 23a, the second port 23b, and the third port 23c of the primary-side end face 21a are located on the first axis Ax1, the second axis Ax2, and the third axis Ax3, respectively, in the primary-side end face 21a. The first port 25 in the secondary-side end face 21b is located on the third axis Ax3 in the secondary-side end face 21b. In the multi-mode interference device 13, the first axis Ax1, the third axis Ax3, and the second axis Ax2 are preferably arranged, at regular intervals, in this order in the direction from the first side face 21c to the second side face 21d.

In the polarization control device 11b, the first phase shifter 15a is optically coupled to the first port 23a in the primary-side end face 21a of the multi-mode interference device 13. The second phase shifter 15b is optically coupled to the second port 23b in the primary-side end face 21a of the multi-mode interference device 13. The third phase shifter 15c is optically coupled to the third port 23c in the primary-side end face 21a of the multi-mode interference device 13. The first phase shifter 15a, the second phase shifter 15b, and the third phase shifter 15c are optically connected via respective single-mode waveguides to the first, second, and third ports 23a, 23b, and 23c, respectively, in the primary-side end face 21a of the multi-mode interference device 13. The first optical waveguide 17a is optically coupled via the first phase shifter 15a to the first port 23a in the primary-side end face 21a of the multi-mode interference device 13. The second optical waveguide 17b is optically coupled via the second phase shifter 15b to the second port 23b in the primary-side end face 21a of the multi-mode interference device 13. The third optical waveguide 17c is optically coupled via the third phase shifter 15c to the third port 23c in the primary-side end face 21a of the multi-mode interference device 13. The first optical waveguide 17a, the second optical waveguide 17b, and the third optical waveguide 17c are each formed as a single-mode waveguide.

The first phase shifter 15a, the second phase shifter 15b, and the third phase shifter 15c have a waveguide structure including a first cladding layer, a core layer, and a second cladding layer. The first phase shifter 15a, the second phase shifter 15b, and the third phase shifter 15c include an electrode or a heater for varying a refractive index of the waveguide structure.

The tapered waveguide 19 has the one end 19a and the other end 19b. The one end 19a of the tapered waveguide 19 is optically coupled to the first port 25 in the secondary-side end face 21b of the multi-mode interference device 13. The width WTP of the tapered waveguide 19 decreases in the direction from the one end 19a to the other end 19b of the tapered waveguide 19.

The polarization mode (TE mode or TM mode) of light propagating in the polarization control device 11b will be described with reference to FIG. 4. The first optical waveguide 17a is optically coupled via the first phase shifter 15a to the first port 23a in the primary-side end face 21a of the multi-mode interference device 13. The second optical waveguide 17b is optically coupled via the second phase shifter 15b to the second port 23b in the primary-side end face 21a of the multi-mode interference device 13. Therefore, by using the first phase shifter 15a and the second phase shifter 15b, a phase difference is created between light beams propagating in the first and second optical waveguides 17a and 17b. These two propagating light beams having a phase difference enter the respective first and second ports 23a and 23b in the primary-side end face 21a of the multi-mode interference device 13. Because of the phase difference, when TE polarized light enters the primary-side end face 21a of the multi-mode interference device 13, TE1 polarized light of higher-order mode is generated at the first port 25 in the secondary-side end face 21b of the multi-mode interference device 13. The higher-order mode light enters and propagates through the tapered waveguide 19. When TE polarized light of higher-order mode enters the one end 19a of the tapered waveguide 19, the higher-order mode light in the tapered waveguide 19 is converted to TM polarized light of fundamental mode (TM0) because of the reduction in the width WTP of the tapered waveguide 19.

The third optical waveguide 17c is optically coupled via the third phase shifter 15c to the third port 23c in the primary-side end face 21a of the multi-mode interference device 13. The third port 23c in the primary-side end face 21a is located on the third axis Ax3 in the primary-side end face 21a. Therefore, light from the third optical waveguide 17c is coupled to the first port 25 on the third axis Ax3 in the secondary-side end face 21b. When TE polarized light enters the primary-side end face 21a of the multi-mode interference device 13, TE polarized light of fundamental mode (TE0) is generated at the first port 25 in the secondary-side end face 21b of the multi-mode interference device 13. The TE polarized light of fundamental mode (TE0) enters and propagates through the tapered waveguide 19, and then enters the single-mode waveguide (input waveguide) 51. When the TE polarized light of fundamental mode (TE0) enters the one end 19a of the tapered waveguide 19, the tapered waveguide 19 outputs the TE polarized light of fundamental mode without changing it to the other end 19b of the tapered waveguide 19.

The polarization control device 11b is composed of a passive device. Therefore, when TM polarized light of fundamental mode propagates backward through the polarization control device 11b, the tapered waveguide 19 generates TE polarized light of higher-order mode from the TM polarized light of fundamental mode. Specifically, when TM polarized light enters the other end 19b of the tapered waveguide 19, the tapered waveguide 19 converts the TM polarized light of fundamental mode to TE polarized light of higher-order mode. The TE polarized light of higher-order mode enters the first port 25 in the secondary-side end face 21b of the multi-mode interference device 13. The multi-mode interference device 13 generates TE polarized light of fundamental mode at the first and second ports 23a and 23b in the primary-side end face 21a. The phase of the TE polarized light at the first port 23a differs from that of the TE polarized light at the second port 23b. By using the first and second phase shifters 15a and 15b, the phases of light beams propagating in the first and second optical waveguides 17a and 17b are adjusted. After the phase adjustment, these light beams propagate through the first and second optical waveguides 29a and 29b.

When TE polarized light of fundamental mode enters the other end 19b of the tapered waveguide 19, the tapered waveguide 19 outputs the TE polarized light of fundamental mode without changing it. The output TE polarized light of fundamental mode enters the first port 25 in the secondary-side end face 21b of the multi-mode interference device 13. The multi-mode interference device 13 generates TE polarized light of fundamental mode at the third port 23c in the primary-side end face 21a. The TE polarized light at the third port 23c propagates through the third optical waveguide 17c. By using the third phase shifter 15c, the phase of a light beam propagating in the third optical waveguide 17c is adjusted with respect to the phase of the light beams propagating in the first and second optical waveguides 17a and 17b.

The polarization control device 11b will be described with reference again to FIG. 3. The first optical waveguide 29a is connected to the first port 23a in the primary-side end face 21a on the first axis Ax1 of the three axes extending from the primary-side end face 21a to the secondary-side end face 21b. The second optical waveguide 29b is connected to the second port 23b in the primary-side end face 21a on the second axis Ax2 of the three axes extending from the primary-side end face 21a to the secondary-side end face 21b. A third optical waveguide 29c is connected to the third port 23c in the primary-side end face 21a on the third axis Ax3 of the three axes extending from the primary-side end face 21a to the secondary-side end face 21b. The tapered waveguide 19 is connected to the first port 25 in the secondary-side end face 21b on the third axis Ax3 of the three axes extending from the primary-side end face 21a to the secondary-side end face 21b. In the primary-side end face 21a of the multi-mode interference device 13, a first point (the position of the first port 23a), a third point (the position of the third port 23c), and a second point (the position of the second port 23b) are arranged in this order in the direction from the first side face 21c to the second side face 21d of the multi-mode interference device 13. These three points (the first point, the second point, and the third point) are defined as points of intersection of a first reference plane extending along the primary-side end face 21a and the first axis Ax1, the second axis Ax2, and the third axis Ax3. In the secondary-side end face 21b of the multi-mode interference device 13, a first point, a third point (the position of the first port 25), and a second point are arranged in this order in the direction from the first side face 21c to the second side face 21d of the multi-mode interference device 13.

The first and second side faces 21c and 21d extend in the direction from the primary-side end face 21a to the secondary-side end face 21b of the multi-mode interference device 13. In an example, the outer side face 31a of the first optical waveguide 29a extends continuously to the first side face 21c of the multi-mode interference device 13. The outer side face 33a of the second optical waveguide 29b extends continuously to the second side face 21d of the multi-mode interference device 13. In the polarization control device 11b having the configuration described above, an optical loss in the multi-mode interference device 13 can be reduced. The inner side face 31b of the first optical waveguide 29a is connected to the primary-side end face 21a. The inner side face 33b of the second optical waveguide 29b is also connected to the primary-side end face 21a. A pair of side faces 53a and 53b of the third optical waveguide 29c is also connected to the primary-side end face 21a. The pair of side faces 35a and 35b of the tapered waveguide 19 is connected to the secondary-side end face 21b. Alternatively, the pair of side faces 35a and 35b of the tapered waveguide 19 is connected via a pair of side faces of the multi-mode waveguide 18 to the secondary-side end face 21b.

As illustrated in FIG. 3, the polarization control device 11b further includes a one-input and three-output branching waveguide (1×3 optical coupler) 37. In the branching waveguide 37, unlike in the branching waveguide 39 of the polarization control device 11a, a secondary-side end 37b has a third port 43c. Also in the branching waveguide 37 of the polarization control device 11b, a primary-side end 37a has the port 41a. The secondary-side end 37b has the first port 43a and the second port 43b as well as the third port 43c described above. The first optical waveguide 17a, the second optical waveguide 17b, and the third optical waveguide 17c are optically coupled to the first port 43a, the second port 43b, and the third port 43c, respectively, in the secondary-side end 37b of the branching waveguide 37.

In the second embodiment, the branching waveguide 37 includes two (first and second) 1×2 optical multiplexer-demultiplexers (1×2 optical couplers). One port of the first 1×2 optical multiplexer-demultiplexer is connected to the optical waveguide 45. One of two ports of the first 1×2 optical multiplexer-demultiplexer is connected to the second phase shifter 15b, whereas the other of the two ports of the first 1×2 optical multiplexer-demultiplexer is connected via two ports of the second 1×2 optical multiplexer-demultiplexer to the first and third phase shifters 15a and 15c.

The polarization control device 11b has the input port 47a and the output port 47b. The input waveguide 45 of the polarization control device 11b supplies input light containing TE polarized light to the port 41a. In an example, the input waveguide 45 extends to the input port 47a of the polarization control device 11b. In the polarization control device 11b, the input light passes through the tapered waveguide 19 and a single-mode waveguide connected to the tapered waveguide 19, and then reaches the output port 47b. In the polarization control device 11b, TM polarized light of fundamental mode (TM0) and TE polarized light of fundamental mode (TE0) are generated at the output port 47b.

Alternatively, the polarization control device 11b has the input port 49a and the output port 49b. The input optical waveguide 51 of the polarization control device 11b supplies input light containing TE polarized light and/or TM polarized light to the multi-mode interference device 13. The input optical waveguide 51 is optically coupled via the tapered waveguide 19 to the first port 25. The input optical waveguide 51 is a single-mode waveguide. In an example, the polarization control device 11b generates TE polarized light of fundamental mode at the first and second ports 23a and 23b in the primary-side end face 21a of the multi-mode interference device 13. The generated beams of light pass through the phase shifters 15a to 15c and are input to the branching waveguide 37, which generates combined light. The combined light passes through the single-mode waveguide 45 and reaches the output port 49b of the polarization control device 11b.

In the polarization control device 11b described above, TE polarized light of fundamental mode is converted to TM polarized light of fundamental mode. Also, TM polarized light of fundamental mode is converted to TE polarized light of fundamental mode.

Figure 5:
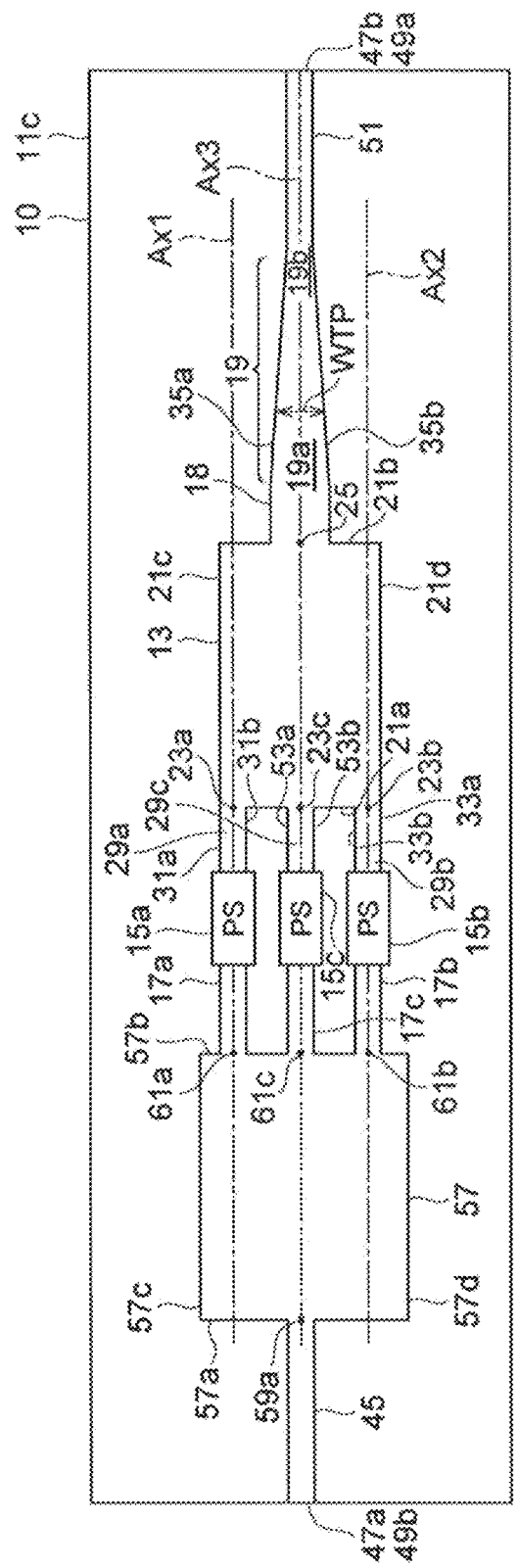
FIG. 5 illustrates a structure of a polarization control device according to a third embodiment.
Figure 6:
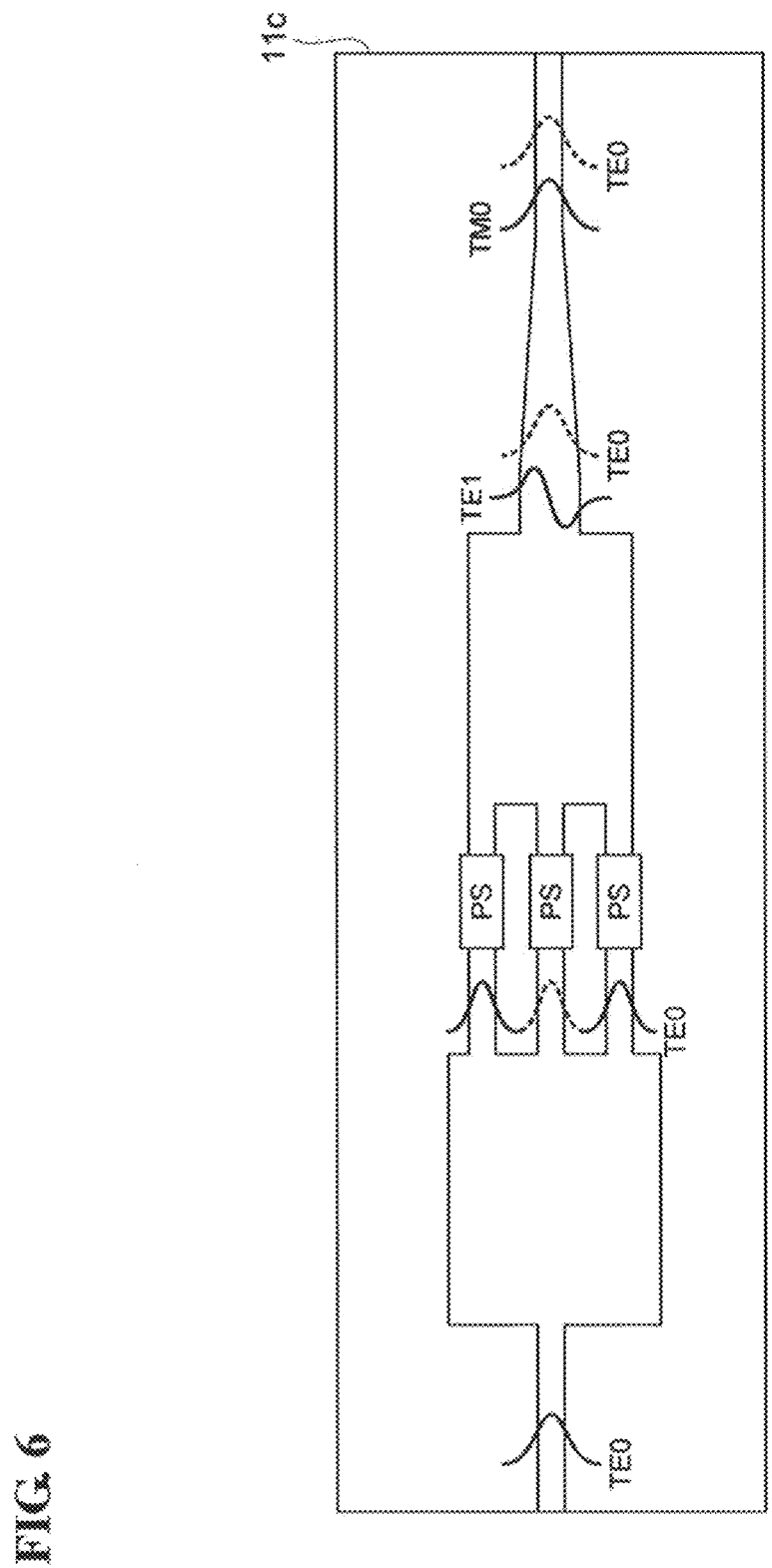
FIG. 6 illustrates propagation of light in the polarization control device illustrated in FIG. 5.

FIG. 5 illustrates a structure of a polarization control device according to a third embodiment. FIG. 6 illustrates a polarization mode (TE mode or TM mode) of light propagating in the polarization control device illustrated in FIG. 5. A polarization control device 11c includes a first multi-mode interference device 13, the first phase shifter 15a, the second phase shifter 15b, the third phase shifter 15c, the first optical waveguide 17a, the second optical waveguide 17b, the third optical waveguide 17c, and the tapered waveguide 19. The polarization control device 11c further includes a second multi-mode interference device 57 serving as a branching (combining) waveguide. In the third embodiment, the second multi-mode interference device 57 has a 1×3 MMI structure. The second multi-mode interference device 57 has a primary-side end face 57a, a secondary-side end face 57b, a first side face 57c, and a second side face 57d. The primary-side end face 57a has a port 59a. The secondary-side end face 57b has a first port 61a, a second port 61b, and a third port 61c. The first optical waveguide 17a, the second optical waveguide 17b, and the third optical waveguide 17c are optically coupled to the first port 61a, the second port 61b, and the third port 61c, respectively, in the secondary-side end face 57b of the second multi-mode interference device 57.

As illustrated in FIGS. 5 and 6, the first multi-mode interference device 13 has a 3×1 MMI structure.

The polarization control device 11c has the input port 47a and the output port 47b. The input waveguide 45 of the polarization control device 11c supplies input light containing TE polarized light to the port 59a of the second multi-mode interference device 57. In an example, the input waveguide 45 extends to the input port 47a of the polarization control device 11c. The TE polarized light from the input waveguide 45 is input to the port 59a of the second multi-mode interference device 57 and coupled to the first, second, and third ports 61a, 61b, and 61c of the second multi-mode interference device 57. The beams of light pass through the optical waveguides 17a to 17c, the phase shifters 15a to 15c, and the optical waveguides 29a to 29c. Then, the beams of light are input to the first port 23a, the second port 23b, and the third port 23c in the primary-side end face 21a of the first multi-mode interference device 13. TE1 polarized light of higher-order mode and TE0 polarized light of fundamental mode are generated at the first port 25 in the secondary-side end face 21b of the first multi-mode interference device 13, pass through the tapered waveguide 19 and the single-mode waveguide 51, and reach the output port 47b, where TM polarized light of fundamental mode (TM0) and TE polarized light of fundamental mode (TE0) are generated.

Alternatively, the polarization control device 11c has the input port 49a and the output port 49b. The optical waveguide 51 of the polarization control device 11c supplies input light containing TE polarized light and/or TM polarized light to the first multi-mode interference device 13. The optical waveguide 51 is a single-mode waveguide. The optical waveguide 51 is optically coupled via the tapered waveguide 19 to the first port 25. In an example, the polarization control device 11c generates TE polarized light of fundamental mode at the first and second ports 23a and 23b in the primary-side end face 21a of the first multi-mode interference device 13. The generated beams of light pass through the phase shifters 15a and 15b and are input to the second multi-mode interference device 57, which generates combined light. The combined light passes through the single-mode waveguide 45 and reaches the output port 49b of the polarization control device 11c. When TE polarized light is supplied to the first port 25, TE polarized light is generated at the third port 23c.

In the polarization control device 11c described above, TE polarized light of fundamental mode is converted to TM polarized light of fundamental mode. Also, TM polarized light of fundamental mode is converted to TE polarized light of fundamental mode.

The operation of the polarization control devices 11a, 11b, and 11c will be described in two parts. First, the operation of the multi-mode interference device 13 will be described. FIGS. 7A to 7C illustrate MMI interference patterns of light propagating in the multi-mode interference device 13. The MMI interference patterns shown in FIGS. 7A to 7C is a calculated result using a finite difference time domain (FDTD) method. The waveguides connected to the ports 23a and 23b of the multi-mode interference device 13 having a 1×3 structure are each a single-mode waveguide having a width at which a higher-order mode is cut off. The waveguide connected to the port 25 has a width substantially twice that of the waveguides connected to the ports 23a and 23b. The waveguide connected to the port 25 is a multi-mode waveguide which allows propagation of higher-order mode. The waveguide connected to the port 23c of the multi-mode interference device 13 having a 1×3 structure is either a single-mode waveguide or a multi-mode waveguide. In an example, like the waveguide connected to the port 25, the waveguide connected to the port 23c may have a width substantially twice that of the waveguides connected to the ports 23a and 23b. FIG. 7A shows that when the fundamental mode of TE polarization enters the port 23c, the fundamental mode of TE polarization is output to the port 25 without change. FIG. 7B shows that when the fundamental mode of TE polarization enters the ports 23a and 23b, the first-order mode (higher-order mode) of TE polarization is output to the port 25. In calculation, a phase difference between light beams incident on the ports 23a and 23b is set to a value of π, for example. FIG. 7C shows that when the fundamental mode of TE polarization enters the ports 23a, 23b, and 23c, both the fundamental mode of TE polarization and the first-order mode of TE polarization are output to the port 25. Referring to FIGS. 7A to 7C, a periodic interference pattern appears in the MMI. That is, by selecting an appropriate MMI length, the fundamental mode of TE polarization and the first-order mode of TE polarization can be extracted efficiently.

The first-order mode of TE polarization is generated at every odd multiple of the fundamental MMI length. In calculation, light enters the ports in the primary-side end face. However, propagation of light is reversible. When the first-order mode of TE polarization enters the secondary-side end face, two light beams of fundamental mode of TE polarization are output from the ports in the primary-side end face. In this example, the length of the multi-mode interference device 13 is 202 μm, and the fundamental MMI length is 67.3 μm.

Figure 8A:
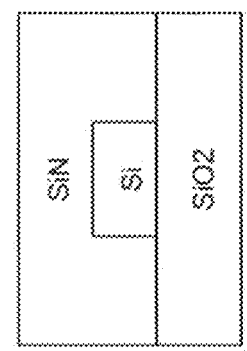
FIGS. 8A and 8B illustrate an operation of a tapered portion.
Figure 8B:
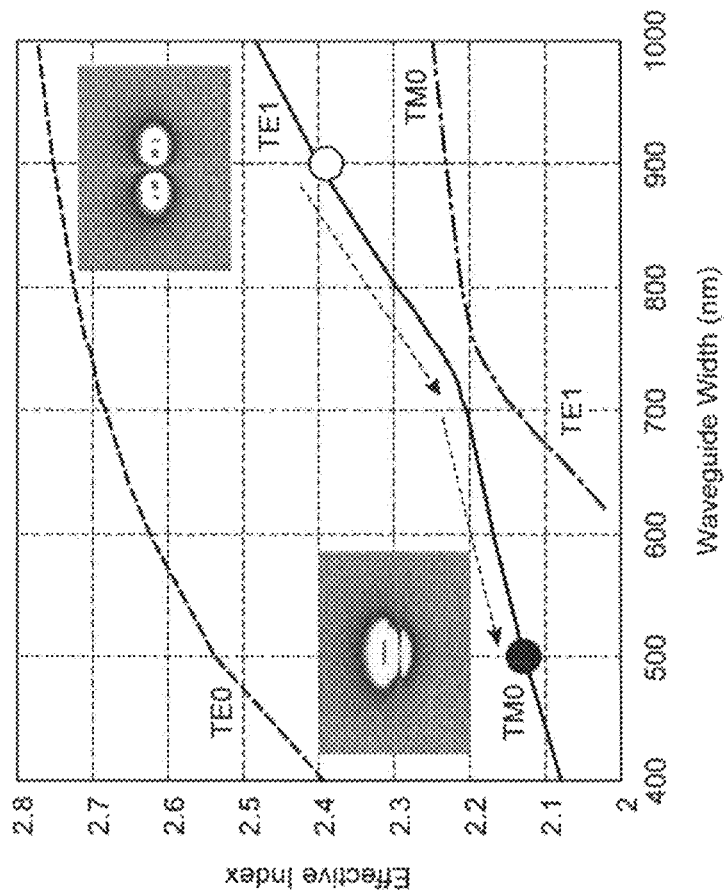

Next, a polarization mode of light propagating in a waveguide having a tapered portion will now be described. FIG. 8B shows an effective refractive index of natural mode as a function of the waveguide width. FIG. 8A is a schematic diagram of a waveguide structure used in the simulation of FIG. 8B. The waveguide structure illustrated in FIG. 8A includes a lower cladding layer made of silicon dioxide (SiO$_2$), an upper cladding layer made of silicon nitride (SiN), and a core layer made of Si surrounded by these cladding layers. In FIG. 8B, the waveguide width corresponds to a width of the core layer. As illustrated in FIG. 8B, a mode conversion between the first-order mode of TE polarization (TE1) and the fundamental mode of TM polarization (TM0) occurs at a width of the core layer of about 750 nm without degradation of the first-order mode of TE polarization (TE1) and the fundamental mode of TM polarization (TM0). For example, the width of the tapered waveguide 19 continuously decreases from 900 nm to 500 nm. In this case, when light having TE1 mode enters a 900-nm-wide end of the waveguide and propagates to the opposite end having a width of 500 nm through the tapered waveguide, the first-order mode of TE polarization (TE1) is converted to the fundamental mode of TM polarization (TM0). On the other hand, since the fundamental mode of TE polarization (TE0) propagates without change, the fundamental mode of TE polarization (TE0) and the fundamental mode of TM polarization (TM0) propagate through the end of the tapered waveguide having the narrower width of 500 nm.

Figure 9A:
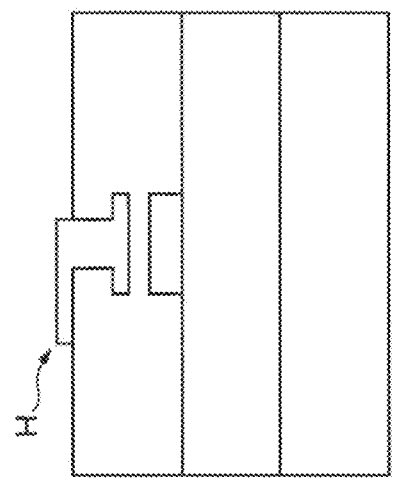
FIGS. 9A and 9B illustrate a waveguide structure used in calculation using the FDTD method.
Figure 9B:
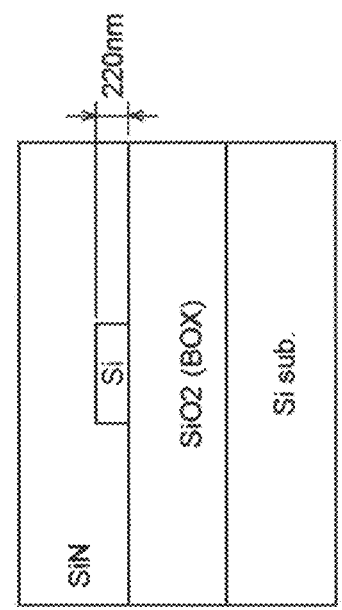

FIGS. 9A and 9B illustrate a specific structure of a waveguide used in calculation using the FDTD method. A result of the calculation using the FDTD method shows that the first-order mode of TE polarization attenuates as it propagates through a reverse-tapered waveguide, and is converted to the fundamental mode of TM polarization. When this tapered waveguide is provided at the port 25 of the multi-mode interference device 13, the fundamental mode of TE polarization can be converted to the fundamental mode of TM polarization.

EXAMPLE 1

An example of the polarization control device 11c will now be described. As illustrated in FIG. 9A, a silicon-on-insulator (SOI) substrate is used, which is obtained by forming a 220-nm-thick Si layer on a 2-μm-thick buried oxide (BOX) layer. A rectangular core layer is formed by etching the Si layer to form an optical waveguide. Next, a 2-μm-thick SiN film is formed on the BOX layer and the Si core layer. The waveguide containing the rectangular Si core layer covered by the upper cladding layer made of SiN film is formed on the BOX layer. The polarization control device 11c basically includes this waveguide structure. Dimensions of this structure will now be described. A thickness of the Si core layer in the waveguide is 220 nm. A width of the Si core layer which constitutes the single-mode optical waveguide 45 is 500 nm. A width and a length of the second multi-mode interference device 57 are 7.2 μm and 33.8 μm, respectively. A width of the optical waveguides 17a to 17c and 29a to 29c which are the single-mode optical waveguide is 500 nm. The optical waveguides 17a to 17c and 29a to 29c are evenly spaced such that their centers coincide with the corresponding axes Ax1, Ax2, and Ax3. The axes Ax1, Ax3, and Ax2 pass through positions of −2.75 μm, 0 μm, and +2.75 μm, respectively, in the direction orthogonal to the optical waveguide direction, and all extend in the same direction (optical waveguide direction). The phase shifters 15a, 15b, and 15c perform phase control by using a heater electrode (e.g., aluminum (Al) electrode) embedded in the SiN film (e.g., see the structure of FIG. 9B). A width and a length of the first multi-mode interference device 13 are 6 μm and 70 μm, respectively. Outer side walls 31a and 33a of the optical waveguides 29a and 29b are in alignment with respective side walls (the first side face 21c and the second side face 21d) of the first multi-mode interference device 13. The center of the optical waveguide 29c is in alignment with the center of the first multi-mode interference device 13. A width and length of the multi-mode waveguide 18 are 1 μm and 20 μm, respectively. The multi-mode waveguide 18 is in alignment with the center of the optical waveguide 29c. A length of the tapered waveguide 19 in the optical waveguide direction is 200 μm. The width of the tapered waveguide 19 gradually changes from 1 μm to 500 nm.

TE fundamental mode light is coupled to the single-mode optical waveguide 45 using lensed-fibers. Output light from the single-mode optical waveguide 51 is input to a light-receiving element (photodiode (PD)) through a polarizer. The state of polarization of light is measured by rotating the polarizer. When the phases of light beams in the optical waveguides 17a, 17c, and 17b are adjusted by using the phase shifters 15a, 15c, and 15b to 0 degrees, 0 degrees, and 180 degrees, respectively, an optical loss in the first multi-mode interference device 13 is minimized.

The output light will be described. The ratio of intensities of TE polarized light and TM polarized light (TE:TM ratio) of the output light at the output port 47b is 1:2, and part of input light is polarization-rotated. The second multi-mode interference device 57 divides light into three light beams. Of the three light beams, those in the optical waveguides 29a and 29b are converted to TM light beams. Therefore, the TE:TM ratio of the output light is not 1:1.

Next, the reverse operation will be described. TE fundamental mode light and TM fundamental mode light are coupled to the tapered waveguide 19, and the polarization state of output light from the waveguide 45 is measured. When the phases of light beams in the optical waveguides 29a, 29c, and 29b are adjusted by using the phase shifters 15a, 15c, and 15b to 0 degrees, 180 degrees, and 0 degrees, respectively, degradation of light intensity is minimized. The TE:TM ratio of the output light at the output port 49b is 1:0.01. This means that input TM light is substantially entirely converted to TE light.

EXAMPLE 2

An example of the polarization control device 11b will now be described. An SOI substrate is used, which is obtained by forming a 220-nm-thick Si layer on a 2-μm-thick BOX layer. A rectangular core layer is formed by etching the Si layer to form an optical waveguide. Next, a 2-μm-thick SiN film is formed on the rectangular core layer. Dimensions of this structure will now be described. A thickness of the Si core layer is 220 nm. A width of the optical waveguide 45 is 500 nm as a single-mode optical waveguide. The branching (combining) waveguide 37 has a Y-branching structure. An MMI or a directional coupler, instead of the Y-branching waveguide, may be used as the branching waveguide 37. A width of the optical waveguides 17a to 17c and 29a to 29c which are the single-mode optical waveguide is 500 nm. The optical waveguides 17a to 17c and 29a to 29c are evenly spaced such that their centers coincide with the respective axes Ax1, Ax2, and Ax3. The axes Ax1, Ax3, and Ax2 pass through positions of −2.75 μm, 0 μm, and +2.75 μm, respectively, in the direction orthogonal to the optical waveguide direction, and all extend in the same direction (optical waveguide direction). The phase shifters 15a, 15b, and 15c have a structure formed by embedding an Al heater in the SiN film. A width and length of the multi-mode interference device 13 are 6 μm and 70 μm, respectively. Outer side walls 31a and 33a of the optical waveguides 29a and 29b are in alignment with respective side walls of the multi-mode interference device 13. The center of the optical waveguide 29c is in alignment with the center of the multi-mode interference device 13. A width and a length of the multi-mode waveguide 18 are 1 μm and 20 μm, respectively. The multi-mode waveguide 18 is coupled to the multi-mode interference device 13 at the center of the multi-mode interference device 13. The width of the tapered waveguide 19 continuously changes from 1 μm to 500 nm. A length of the tapered waveguide 19 is 200 μm.

TE fundamental mode light is coupled to the optical waveguide 45 and the polarization state of light output from the tapered waveguide 19 is measured. When the phases of light beams propagating in the optical waveguides 17a to 17c are adjusted to be the same by using the phase shifters 15a to 15c, an optical loss in the multi-mode interference (MMI) device 13 is minimized. The measurement of the polarization state of output light shows that the TE:TM ratio of the output light is 1:1. This means that TE and TM polarized light beams of equal intensity are generated from TE polarized input light of fundamental mode. Thus, in Example 2, when TE polarized light enters the optical waveguide 45, output light having a TE:TM ratio of 1:1 is obtained without excessive optical loss.

EXAMPLE 3

An example of the polarization control device 11a will now be described. An SOI substrate is used, which is obtained by forming a 220-nm-thick Si layer on a 2-μm-thick BOX layer. A rectangular core layer is formed by etching the Si layer to form an optical waveguide. Next, a 2-μm-thick SiN film is formed on the rectangular core layer. Dimensions of this structure will now be described. A thickness of the Si core layer is 220 nm. A width of the optical waveguide 45 is 500 nm as a single-mode optical waveguide. The branching (combining) waveguide 39 has a Y-branching structure. A width of the optical waveguides 17a and 17b is 500 nm. The phase shifters 15a and 15b use an Al heater embedded in the SiN film. A width and a length of the multi-mode interference device 13 are 6 μm and 70 μm, respectively. Outer side walls 31a and 33a of the optical waveguides 29a and 29b are in alignment with respective side walls of the multi-mode interference device 13. A width and a length of the multi-mode waveguide 18 are 1 μm and 20 μm, respectively. The multi-mode waveguide 18 is connected to the multi-mode interference device 13 at the center of the multi-mode interference device 13. The width of the tapered waveguide 19 continuously changes from 1 μm to 500 nm. A length of the tapered waveguide 19 is 200 μm.

TE polarized light of fundamental mode is coupled to the optical waveguide 45 and the polarization state of light output from the optical waveguide 51 is measured. When the phases of light beams propagating in the optical waveguides 17a and 17b are adjusted by using the phase shifters 15a and 15b to 0 degrees and 180 degrees, respectively, an optical loss in the multi-mode interference device 13 is minimized. The measurement of the polarization state of light output from the optical waveguide 51 shows that the TE:TM ratio of the output light is 0.01:1. This means that TE polarized input light of fundamental mode is converted to TM polarized light of fundamental mode.

In Examples 1 to 3, the phase shifters are provided for respective optical waveguides connected to the multi-mode interference device 13. A phase shifter is provided for the purpose of assigning a desired phase to light propagating in the waveguide, so as to adjust a phase difference between light beams toward the multi-mode interference device 13. Therefore, a phase shifter (or phase shifters) may be provided for one or two of the optical waveguides 17a to 17c, or may be provided for all the optical waveguides 17a to 17c.

The phase shifters having a heater structure are used in Examples 1 to 3 described above. Alternatively, the phase shifters may be configured such that one phase shifter has a length or width different from that of the other (or others) for the other waveguide (or waveguides), or such that a pn junction is formed to apply a forward or reverse bias.

In Examples 1 to 3, a SiN film is used as the upper cladding layer and a $SiO_2$ layer is used as a lower cladding layer. The optical waveguides may be of any materials as long as they have a structure where a refractive index of the upper cladding layer differs from that of the lower cladding layer. Therefore, for example, air, dielectric film such as SiON, or resin such as bisbenzocyclobutene (BCB) resin and polyimide resin may be used as a material of the upper cladding layer. A III-V group compound semiconductor or a silica-based material may be used as a material of a core layer.

In the manufacture of the polarization control devices described above, a stacked layer for a waveguide structure is formed on a substrate. By using a mask formed on the stacked layer, the stacked layer is etched to form a waveguide pattern on the substrate. Since etching is required to be performed just once, the polarization control devices can be manufactured by a simple process which requires no alignment. After formation of a waveguide pattern, an electrode structure is formed as necessary.

In Examples 1 to 3, input light is supplied from the optical waveguide 45. However, since propagation of light through optical waveguides is reversible in the polarization control devices described above, input light may be supplied from the optical waveguide 51.

Figure 10B:
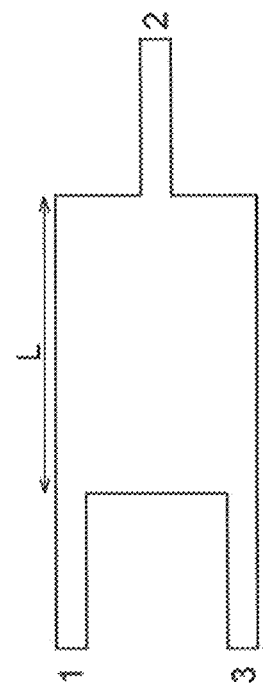
FIG. 10B shows the schematic structure of MMI device used for calculation.
Figure 10A:
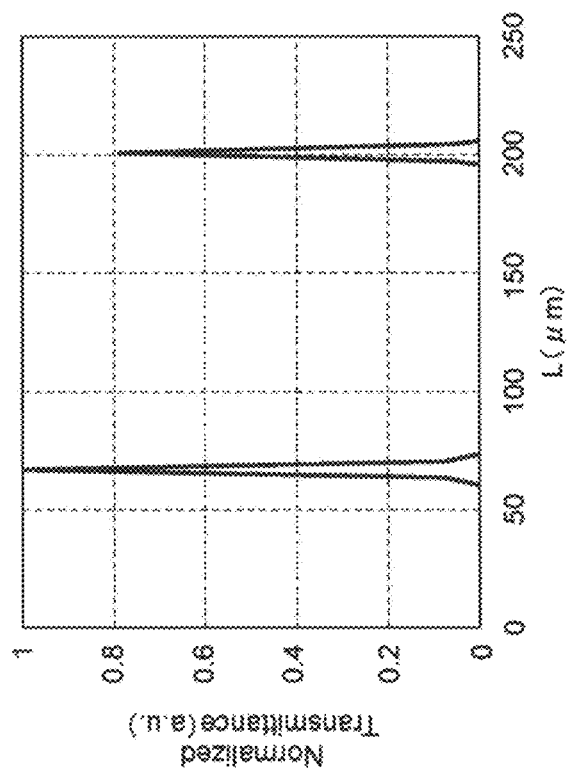
FIG. 10A shows the normalized transmittance of the multi-mode interference (MMI) device as a function of the length L of the MMI device.

FIG. 10A shows the normalized transmittance of the multi-mode interference (MMI) device as a function of the length L of the MMI device (hereafter, denoted as MMI length L). That is, FIG. 10A shows how the optical intensity of TE polarized light of first-order mode (TE1) output from a port 2 (first port 25) of the MMI device changes, with varying the MMI length L, when TE fundamental mode (TE0) enters ports 1 and 3 (first and second ports 23a and 23b) of the MMI device. The result shown in FIG. 10A is obtained by calculation using the MMI device having the input/output port structure illustrated in FIG. 10B. The input/output ports 1 to 3 of MMI device are shown in FIG. 10B. Referring to FIG. 10A, the first-order mode of TE polarization (TE1) is efficiently extracted at the fundamental length of an MMI length L and at a length three times the fundamental length of the MMI length L. In calculation, the fundamental length of an MMI length L is 67.3 μm. The MMI device having the fundamental length has an optical loss lower than that of the MMI device having triple length of the fundamental length. The MMI device having the fundamental length outputs TE polarized light of first-order mode with a larger optical intensity as compared to the MMI device having triple length of the fundamental length.

Figure 11A:
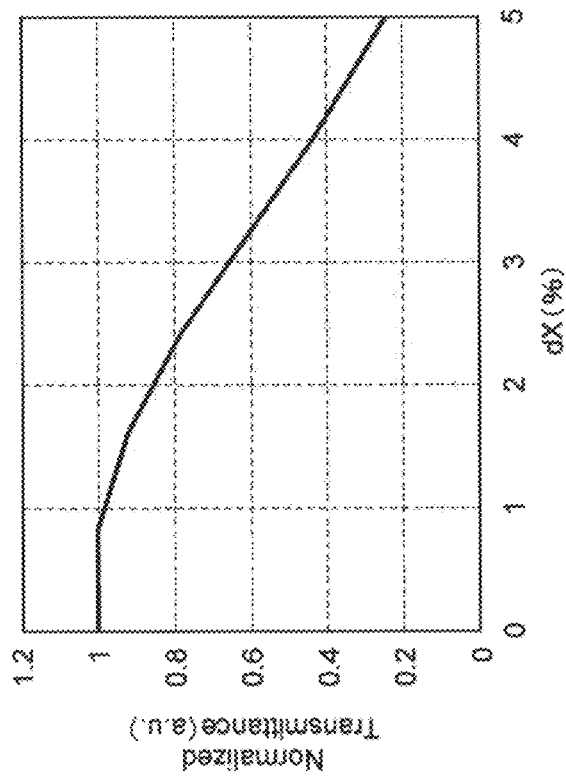
FIG. 11A shows the normalized transmittance of the multi-mode interference (MMI) device as a function of the positional deviation dX of a waveguide connected to an outer port.
Figure 11B:
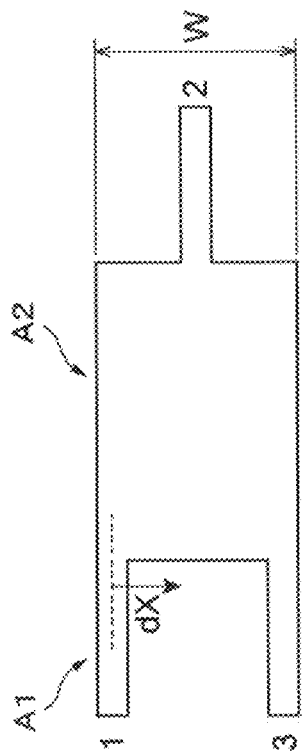
FIGS. 11B and 11C show the schematic structures of MMI device used for calculation.
Figure 11C:

FIG. 11A shows the normalized transmittance of the multi-mode interference (MMI) device as a function of the positional deviation dX of a waveguide connected to an outer port. The result shown in FIG. 11A is obtained by calculation using the MMI device having the input/output port structure illustrated in FIGS. 11B and 11C. The input/output ports 1 to 3 of MMI device are shown in FIGS. 11B and 11C. FIG. 11A shows how the optical intensity of TE polarized light of first-order mode output from the port 2 (first port 25) of the MMI device changes when the ports 1 and 3 (first and second ports 23a and 23b) on the outside of the MMI device are shifted in the width direction from ideal connection positions. Referring to FIG. 11A, when the positional deviation dX of the waveguide connected to the outer port is less than or equal to 1% of the width W of the MMI device (hereafter, denoted as MMI width W), a low optical loss in the MMI device is maintained.

When the positional deviation dX of the waveguide connected to the outer port is more than 1% of the MMI width W, the optical loss in the MMI device increases as dX increases.

Note that dX is defined by dX=X/W×100(%), where X is a connection position in the width direction when an ideal position of a waveguide (i.e., a position where a side wall of the waveguide is in alignment with a side wall of the MMI device) is taken as zero, and W is an MMI width.

The present invention is not limited to any specific configuration disclosed in the embodiments.

Principles of the present invention have been described on the basis of preferred embodiments with reference to the drawings. However, those skilled in the art will understand that the embodiments can be changed in terms of details without departing from the principles. Therefore, all the modifications and changes within the scope and the spirit of Claims are claimed as the present invention.

What is claimed is:

1. A polarization control device comprising:
    a multi-mode interference device having a primary-side end face including a first port, a second port and a third port located between the first port and the second port, a secondary-side end face including a port, a first side face, and a second side face;
    a first phase shifter optically coupled to the first port in the primary-side end face of the multi-mode interference device;
    a first optical waveguide optically coupled via the first phase shifter to the first port in the primary-side end face of the multi-mode interference device;
    a second optical waveguide optically coupled to the second port in the primary-side end face of the multi-mode interference device;
    a third optical waveguide optically coupled to the third port in the primary-side end face of the multi-mode interference device; and
    a tapered waveguide having one end and an other end, the one end being optically coupled to the port in the secondary-side end face of the multi-mode interference device, wherein
    the first port in the primary-side end face and the second port in the primary-side end face are located on a first axis and a second axis, respectively, in the primary-side end face,
    the port in the secondary-side end face is located on a third axis in the secondary-side end face, the third axis being located between the first axis and the second axis,
    the third port in the primary-side end face is located on the third axis in the primary-side end face,
    the first axis, the second axis, and the third axis extend in a direction from the primary-side end face to the secondary-side end face of the multi-mode interference device, and
    the tapered waveguide has a width decreasing in a direction from the one end to the other end of the tapered waveguide.

2. The polarization control device according to claim 1, wherein
    the first side face and the second side face extend in the direction from the primary-side end face to the secondary-side end face of the multi-mode interference device;
    the first optical waveguide has an outer side face extending continuously to the first side face of the multi-mode interference device; and
    the second optical waveguide has an outer side face extending continuously to the second side face of the multi-mode interference device.

3. The polarization control device according to claim 1, further comprising a second phase shifter optically coupled to the second port in the primary-side end face of the multi-mode interference device,
    wherein the second optical waveguide is optically coupled via the second phase shifter to the second port in the primary-side end face of the multi-mode interference device.

4. The polarization control device according to claim 1, further comprising a branching waveguide having a primary-side end including a port and a secondary-side end including a first port and a second port,
    wherein the first optical waveguide and the second optical waveguide are optically coupled to the first port and the second port, respectively, in the secondary-side end of the branching waveguide.

5. The polarization control device according to claim 4, further comprising an input waveguide configured to supply input light containing transverse electric polarized light to the port in the primary-side end of the branching waveguide.

6. The polarization control device according to claim 1, further comprising a second multi-mode interference device having a primary-side end face including a port, a secondary-side end face, a first side face, and a second side face, the secondary-side end face including a first port, a second port, and a third port;
    wherein the first optical waveguide, the second optical waveguide, and the third optical waveguide are optically coupled to the first port, the second port, and the third port, respectively, in the secondary-side end face of the second multi-mode interference device.

7. The polarization control device according to claim 1, further comprising a branching waveguide having a primary-side end including a port and a secondary-side end including a first port, a second port, and a third port,
    wherein the first optical waveguide, the second optical waveguide, and the third optical waveguide are optically coupled to the first port, the second port, and the third port, respectively, in the secondary-side end of the branching waveguide.

8. The polarization control device according to claim 1, further comprising a third phase shifter optically coupled to the third port in the primary-side end face of the multi-mode interference device,
    wherein the third optical waveguide is optically coupled via the third phase shifter to the third port in the primary-side end face of the multi-mode interference device.

9. The polarization control device according to claim 1, wherein the multi-mode interference device has a 3×1 multi-mode interference device structure.

10. The polarization control device according to claim 1, further comprising an input optical waveguide configured to supply input light containing transverse electric polarized light and/or transverse magnetic polarized light to the multi-mode interference device,
    wherein the input optical waveguide is optically coupled via the tapered waveguide to the port in the secondary-side end face of the multi-mode interference device.

11. A polarization control device comprising:
    a multi-mode interference device having a primary-side end face including a first port and a second port, a secondary-side end face including a port, a first side face, and a second side face;
    a first phase shifter optically coupled to the first port in the primary-side end face of the multi-mode interference device;

a first optical waveguide optically coupled via the first phase shifter to the first port in the primary-side end face of the multi-mode interference device;

a second optical waveguide optically coupled to the second port in the primary-side end face of the multi-mode interference device;

a tapered waveguide having one end and an other end, the one end being optically coupled to the port in the secondary-side end face of the multi-mode interference device; and an input optical waveguide configured to supply input light containing transverse electric polarized light and/or traverse magnetic polarized light to the multi-mode interference device, the input optical waveguide being optically coupled via the tapered waveguide to the port in the secondary-side end face of the multi-mode interference device, wherein the first port in the primary-side end face and the second port in the primary-side end face are located on a first axis and a second axis, respectively, in the primary-side end face, the port in the secondary-side end face is located on a third axis in the secondary-side end face, the third axis being located between the first axis and the second axis, the first axis, the second axis, and the third axis extend in a direction from the primary-side end face to the secondary-side end face of the multi-mode interference device, and the tapered waveguide has a width decreasing in a direction from the one end to the e other end of the tapered waveguide.

* * * * *